United States Patent
Park et al.

(10) Patent No.: US 12,534,228 B2
(45) Date of Patent: Jan. 27, 2026

(54) LAUNCH PAD SYSTEM

(71) Applicant: KOREA AEROSPACE RESEARCH INSTITUTE, Daejeon (KR)

(72) Inventors: Kwang Kun Park, Daejeon (KR); I Sang Yu, Daejeon (KR); Seung Whan Baek, Daejeon (KR); Young Suk Jung, Daejeon (KR); Kie Joo Cho, Daejeon (KR)

(73) Assignee: KOREA AEROSPACE RESEARCH INSTITUTE, Daejean (KR)

( * ) Notice: Subject to any disclaimer, the term of this patent is extended or adjusted under 35 U.S.C. 154(b) by 0 days.

(21) Appl. No.: 18/220,395

(22) Filed: Jul. 11, 2023

(65) Prior Publication Data
US 2024/0140623 A1   May 2, 2024

(30) Foreign Application Priority Data

Oct. 28, 2022   (KR) .......... 10-2022-0141041

(51) Int. Cl.
*B64G 5/00* (2006.01)

(52) U.S. Cl.
CPC ..................... *B64G 5/00* (2013.01)

(58) Field of Classification Search
CPC ...................................... B64G 5/00
See application file for complete search history.

(56) References Cited

U.S. PATENT DOCUMENTS

| | | | | |
|---|---|---|---|---|
| 5,479,959 | A * | 1/1996 | Stotelmyer | B64G 1/4021 177/60 |
| 6,116,030 | A * | 9/2000 | Story | F04F 5/466 62/7 |
| 8,596,075 | B2 | 12/2013 | Allam et al. | |
| 11,859,579 | B1 * | 1/2024 | Dallmann | F02K 9/28 |
| 2003/0037819 | A1 * | 2/2003 | Mueller | B64G 5/00 73/290 R |
| 2009/0110983 | A1 * | 4/2009 | Yoon | H01M 8/04291 429/430 |
| 2010/0221627 | A1 * | 9/2010 | Nakakubo | F28D 15/043 165/104.21 |
| 2010/0252686 | A1 * | 10/2010 | Raymond | F02K 9/46 244/172.2 |
| 2020/0108952 | A1 * | 4/2020 | Swenson | F02K 9/566 |
| 2023/0366513 | A1 * | 11/2023 | Minas | F17C 5/02 |

FOREIGN PATENT DOCUMENTS

| | | | |
|---|---|---|---|
| JP | 5256720 B2 | 8/2013 | |
| KR | 1020090078791 | 3/2011 | |
| KR | 20210126817 A * | 10/2021 | |
| RU | 2155705 C2 * | 9/2000 | B64F 1/28 |

* cited by examiner

*Primary Examiner* — Joshua D Huson
*Assistant Examiner* — Anna L. Gordon
(74) *Attorney, Agent, or Firm* — Grogan, Tuccillo & Vanderleeden, LLP

(57) ABSTRACT

A launch pad system includes a fuel vent port provided in a launch vehicle, a launch pad fuel tank provided outside the launch vehicle to store fuel, a fuel recovery line connecting the fuel vent port and the launch pad fuel tank such that the fuel is transferred therethrough, and a fuel transfer unit provided on the fuel recovery line to transfer the fuel, wherein the fuel may be recovered from the launch vehicle to the launch pad fuel tank.

7 Claims, 3 Drawing Sheets

LAUNCH PAD SYSTEM

CROSS-REFERENCE TO RELATED APPLICATION

This application claims the benefit of Korean Patent Application No. 10-2022-0141041, filed on Oct. 28, 2022, in the Korean Intellectual Property Office, the entire disclosure of which is incorporated herein by reference for all purposes.

BACKGROUND

1. Field of the Invention

The present disclosure relates to a launch pad system.

2. Description of the Related Art

A launch pad is a device used to launch a launch vehicle, and technology for efficient use of launch pads has been recently developed with the development of technology for launch vehicles. Exhaust gases are emitted from a launch vehicle at high temperatures and pressures in excess of 1000 pounds per square inch (psi). In order to prevent the destruction of the launch vehicle due to the large volume and pressure of the gases, a launch pad needs to have a sturdy structure for discharging the exhaust gases of the launch vehicle.

A propellant supplied to a launch vehicle before launch should be supplied within the propellant temperature range set for normal operation of an engine, and in particular, a cryogenic propellant is used in many cases. During cryogenic propellant charging, a large amount of the propellant is vaporized and abandoned into the atmosphere through a launch vehicle vent valve. Liquid oxygen does not cause any environmental issues even when it is vaporized, but a methane-fueled launch vehicle that has been recently developed causes the greenhouse effect as methane is emitted to the atmosphere during charging.

For eco-friendly use, many studies on launch pad systems are being conducted.

A method and device enabling a rocket engine pump to be driven by an internal combustion engine are disclosed in US 2010/0252686 A1.

The above description is information the inventor(s) acquired during the course of conceiving the present disclosure, or already possessed at the time, and is not necessarily art publicly known before the present application was filed.

SUMMARY

Embodiments provide a launch pad system that may liquefy gas exhausted while a launch vehicle is charged with a cryogenic propellant and use the liquefied gas as a propellant or generate electricity.

Embodiments provide a launch pad system that may recover and use an exhausted propellant for charging, thereby increasing the use efficiency of the propellant.

Embodiments provide an eco-friendly launch pad system that may recover an exhausted propellant to prevent the greenhouse effect.

According to an aspect, there is provided a launch pad system including a fuel vent port provided in a launch vehicle, a launch pad fuel tank provided outside the launch vehicle to store fuel, a fuel recovery line connecting the fuel vent port and the launch pad fuel tank such that the fuel is transferred therethrough, and a fuel transfer unit provided on the fuel recovery line to transfer the fuel, wherein the fuel may be recovered from the launch vehicle to the launch pad fuel tank.

The launch pad system may further include a freezing unit provided on the fuel recovery line to cool the fuel, wherein the fuel may be liquefied through the freezing unit and introduced into the launch pad fuel tank.

The launch pad system may further include a fuel inlet port provided in the launch vehicle and connected to the launch pad fuel tank, and a fuel supply line connecting the launch pad fuel tank and the fuel inlet port to supply the fuel to the launch vehicle, wherein the fuel stored in the launch pad fuel tank may be supplied to the launch vehicle through the fuel supply line and the fuel inlet port.

The launch pad system may further include a fuel vent valve provided on the fuel recovery line, wherein a portion of the fuel may be discharged to the outside through the fuel vent valve.

The launch vehicle may include a first-stage launch vehicle and a second-stage launch vehicle, and the fuel recovery line may include a first fuel recovery line connected to the first-stage launch vehicle, and a second fuel recovery line connected to the second-stage launch vehicle.

The launch pad system may further include an oxidizer vent port provided in the launch vehicle, a launch pad oxidizer tank provided outside the launch vehicle to store an oxidizer, an oxidizer recovery line connecting the oxidizer vent port and the launch pad oxidizer tank such that the oxidizer is transferred therethrough, and an oxidizer transfer unit provided on the oxidizer recovery line to transfer the oxidizer, wherein the oxidizer may be recovered from the launch vehicle to the launch pad oxidizer tank.

The launch pad system may further include a fuel cell connected to the launch pad fuel tank and the launch pad oxidizer tank, wherein the fuel may be hydrogen, the oxidizer may be oxygen, and the fuel cell may receive hydrogen from the launch pad fuel tank and receive oxygen from the launch pad oxidizer tank to generate electricity.

The launch pad system may further include an oxidizer vent valve provided on the oxidizer recovery line, wherein a portion of the oxidizer may be discharged to the outside through the oxidizer vent valve.

The launch pad system may further include an engine cooling port provided in the launch vehicle, an engine cooling line connecting the engine cooling port and the launch pad fuel tank such that the fuel is transferred therethrough, an engine cooling transfer unit provided on the engine cooling line to transfer the fuel, and an engine cooling freezing unit provided on the engine cooling line to cool the fuel, wherein the engine cooling line may control an output of the engine cooling transfer unit and an output of the engine cooling freezing unit through interoperation with a temperature sensor and a pressure sensor in an engine.

Additional aspects of embodiments will be set forth in part in the description which follows and, in part, will be apparent from the description, or may be learned by practice of the disclosure.

According to embodiments, a launch pad system may liquefy gas exhausted while a launch vehicle is charged with a cryogenic propellant and use the liquefied gas as a propellant or generate electricity.

According to embodiments, a launch pad system may recover and use an exhausted propellant for charging, thereby increasing the use efficiency of the propellant.

According to embodiments, a launch pad system may be eco-friendly as recovering an exhausted propellant to prevent the greenhouse effect

BRIEF DESCRIPTION OF THE DRAWINGS

These and/or other aspects, features, and advantages of the invention will become apparent and more readily appreciated from the following description of embodiments, taken in conjunction with the accompanying drawings of which.

DETAILED DESCRIPTION

Figure 1:
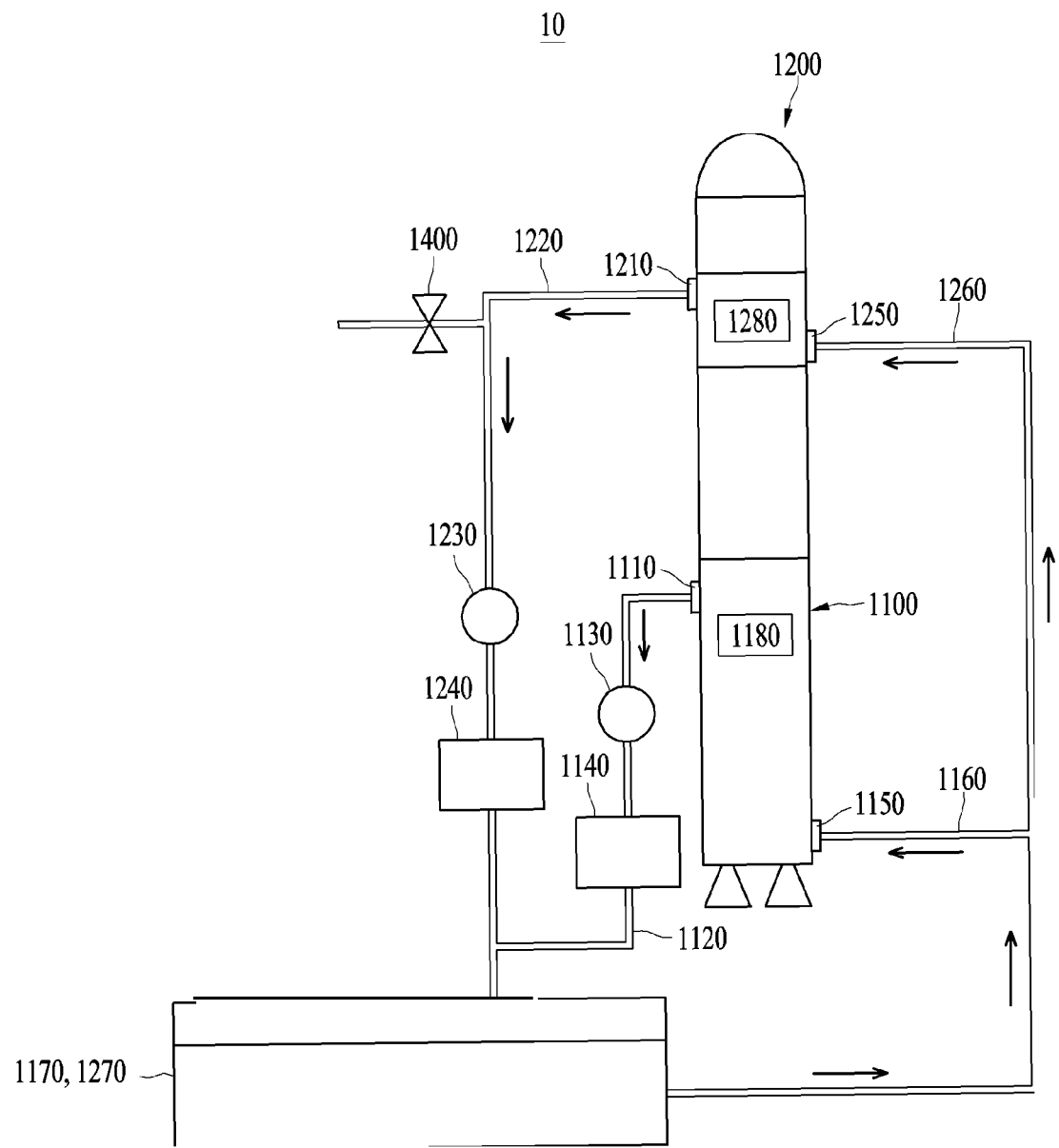
FIG. 1 illustrates a launch pad system according to a first embodiment.

Hereinafter, embodiments will be described in detail with reference to the accompanying drawings. However, various alterations and modifications may be made to the embodiments, and thus, the embodiments are not construed as limiting the scope of the rights of the patent application. The embodiments should be understood to include all changes, equivalents, and replacements within the idea and the technical scope of the disclosure.

The terminology used herein is for the purpose of describing particular embodiments only and is not intended to be limiting. The singular forms "a," "an," and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms including technical and scientific terms used herein have the same meaning as commonly understood by one of ordinary skill in the art to which embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

When describing the embodiments with reference to the accompanying drawings, like reference numerals refer to like constituent elements and a repeated description related thereto will be omitted. In the description of embodiments, detailed description of well-known related structures or functions will be omitted when it is deemed that such description will cause ambiguous interpretation of the present disclosure.

Also, in the description of the components, terms such as first, second, A, B, (a), (b) or the like may be used herein when describing components of the present disclosure. These terms are used only for the purpose of discriminating one constituent element from another constituent element, and the nature, the sequences, or the orders of the constituent elements are not limited by the terms. When one constituent element is described as being "connected", "coupled", or "attached" to another constituent element, it should be understood that one constituent element can be connected or attached directly to another constituent element, and an intervening constituent element can also be "connected", "coupled", or "attached" to the constituent elements.

The same name may be used to describe an element included in the embodiments described above and an element having a common function. Unless otherwise mentioned, the descriptions of the examples may be applicable to the following examples and thus, duplicated descriptions will be omitted for conciseness.

Hereinbelow, embodiments of the disclosure will be described in detail with reference to the accompanying drawings so that the embodiments may be readily implemented by one of ordinary skill in the technical field to which the disclosure pertains. However, the present disclosure may be implemented in many different forms and is not limited to the embodiments described herein. Also, parts irrelevant to the description are omitted from the drawings for a clear description of the disclosure.

FIG. 1 illustrates a launch pad system 10 according to a first embodiment.

Referring to FIG. 1, the launch pad system 10 according to the first embodiment may include a fuel vent port 1110, 1210 provided in a launch vehicle 1100, 1200, a launch pad fuel tank 1170, 1270 provided outside the launch vehicle 1100, 1200 to store fuel, a fuel recovery line 1120, 1220 connecting the fuel vent port 1110, 1210 and the launch pad fuel tank 1170, 1270 such that the fuel may be transferred therethrough, and a fuel transfer unit 1130, 1230 provided on the fuel recovery line 1120, 1220 to transfer the fuel, and the fuel may be recovered from the launch vehicle 1100, 1200 to the launch pad fuel tank 1170, 1270. Here, the fuel may be methane, for example.

The launch vehicle 1100, 1200 may include a first-stage launch vehicle 1100 and a second-stage launch vehicle 1200.

The fuel recovery line 1120, 1220 may include a first fuel recovery line 1120 connected to the first-stage launch vehicle 1100 and a second fuel recovery line 1220 connected to the second-stage launch vehicle 1200.

The fuel vent port 1110, 1210 may include a first fuel vent port 1110 connected to the first fuel recovery line 1120 and a second fuel vent port 1210 connected to the second fuel recovery line 1220.

The fuel discharged when the launch vehicle 1100, 1200 is charged or when an engine (not shown) is cooled may be transferred from the first fuel vent port 1110 or the second fuel vent port 1210 to the launch pad fuel tank 1170, 1270 along the first fuel recovery line 1120 or the second fuel recovery line 1220. The first fuel recovery line 1120, the second fuel recovery line 1220, and the launch pad fuel tank 1170, 1270 may be automatically separated from the launch vehicle 1100, 1200 before engine ignition.

The fuel transfer unit 1130, 1230 may include a first fuel transfer unit 1130 on the first fuel recovery line 1120 and a second fuel transfer unit 1230 on the second fuel recovery line 1220, and the fuel transfer unit 1130, 1230 may be a pump or a blower.

The fuel or vaporized gas of the fuel may be transferred to the launch pad fuel tank 1170, 1270 through the first fuel transfer unit 1130 or the second transfer unit 1230. The transfer output of the fuel transfer unit 1130, 1230 may be controlled through interoperation with a pressure sensor and a temperature sensor in a launch vehicle fuel tank 1180, 1280. During fuel charging, the output of the fuel transfer unit 1130, 1230 may be controlled so that the launch vehicle fuel tank 1180, 1280 may be internally at the level of atmospheric pressure. In addition, if there is a desired operational fuel temperature of the launch vehicle 1100, 1200, the output of the fuel transfer unit 1130, 1230 may be controlled through interoperation with the temperature sensor in the launch vehicle fuel tank 1180, 1280, and thus, the fuel temperature may be controlled.

The launch pad system 10 according to the first embodiment may further include a freezing unit 1140, 1240 provided on the fuel recovery line 1120, 1220 to cool the fuel, and the fuel may be liquefied through the freezing unit 1140, 1240 and introduced into the launch pad fuel tank 1170, 1270. The freezing unit 1140, 1240 may be a freezer.

The freezing unit 1140, 1240 may include a first freezing unit 1140 on the first fuel recovery line 1120 and a second freezing unit 1240 on the second fuel recovery line 1220.

The vaporized gas of the fuel may pass through the first fuel transfer unit 1130 or the second fuel transfer unit 1230 and be re-liquefied through the first freezing unit 1140 or the second freezing unit 1240. Vaporized gas of the liquefied fuel may be introduced into the launch pad fuel tank 1170, 1270 and may be used again to charge the launch vehicle fuel tank 1180, 1280.

The launch pad system 10 according to the first embodiment may further include a fuel inlet port 1150, 1250 provided in the launch vehicle 1100, 1200 and connected to the launch pad fuel tank 1170, 1270, and a fuel supply line 1160, 1260 connecting the launch pad fuel tank 1170, 1270 and the fuel inlet port 1150, 1250 to supply the fuel to the launch vehicle 1100, 1200. The fuel stored in the launch pad fuel tank 1170, 1270 may be supplied to the launch vehicle 1100,1200 through the fuel supply line 1160, 1260 and the fuel inlet port 1150, 1250.

The fuel inlet port 1150, 1250 may include a first fuel inlet port 1150 on the first fuel recovery line 1120 and a second fuel inlet port 1250 on the second fuel recovery line 1220.

The fuel supply line 1160, 1260 may include a first fuel supply line 1160 on the first fuel recovery line 1120 and a second fuel supply line 1260 on the second fuel recovery line 1220.

The launch pad system 10 according to the first embodiment may further include a fuel vent valve 1400 provided on the fuel recovery line 1120, 1220, and a portion of the fuel may be discharged to the outside through the fuel vent valve 1400.

The fuel vent valve 1400 may be provided on a branched line between the first fuel vent port 1110 and the first fuel transfer unit 1130 or between the second fuel vent port 1210 and the second fuel transfer unit 1230 on the first fuel recovery line 1120 or the second fuel recovery line 1220.

Gases other than the vaporized gas of the fuel, such as air, inside the launch vehicle fuel tank 1180, 1280 may be discharged through the fuel vent valve 1400 in the initial stage of fuel charging.

In addition, when the first fuel transfer unit 1130 or the second fuel transfer unit 1230 is out of order, the fuel vent valve 1400 may be opened so that fuel charging may be performed in the same manner as general launch pads.

When the fuel vent valve 1400 is closed in response to the completion of fuel charging or when a valve for engine cooling is closed in response to the completion of launch vehicle engine cooling, the launch pad system 10 according to the first embodiment may be separated from the launch vehicle 1100, 1200.

Figure 2:
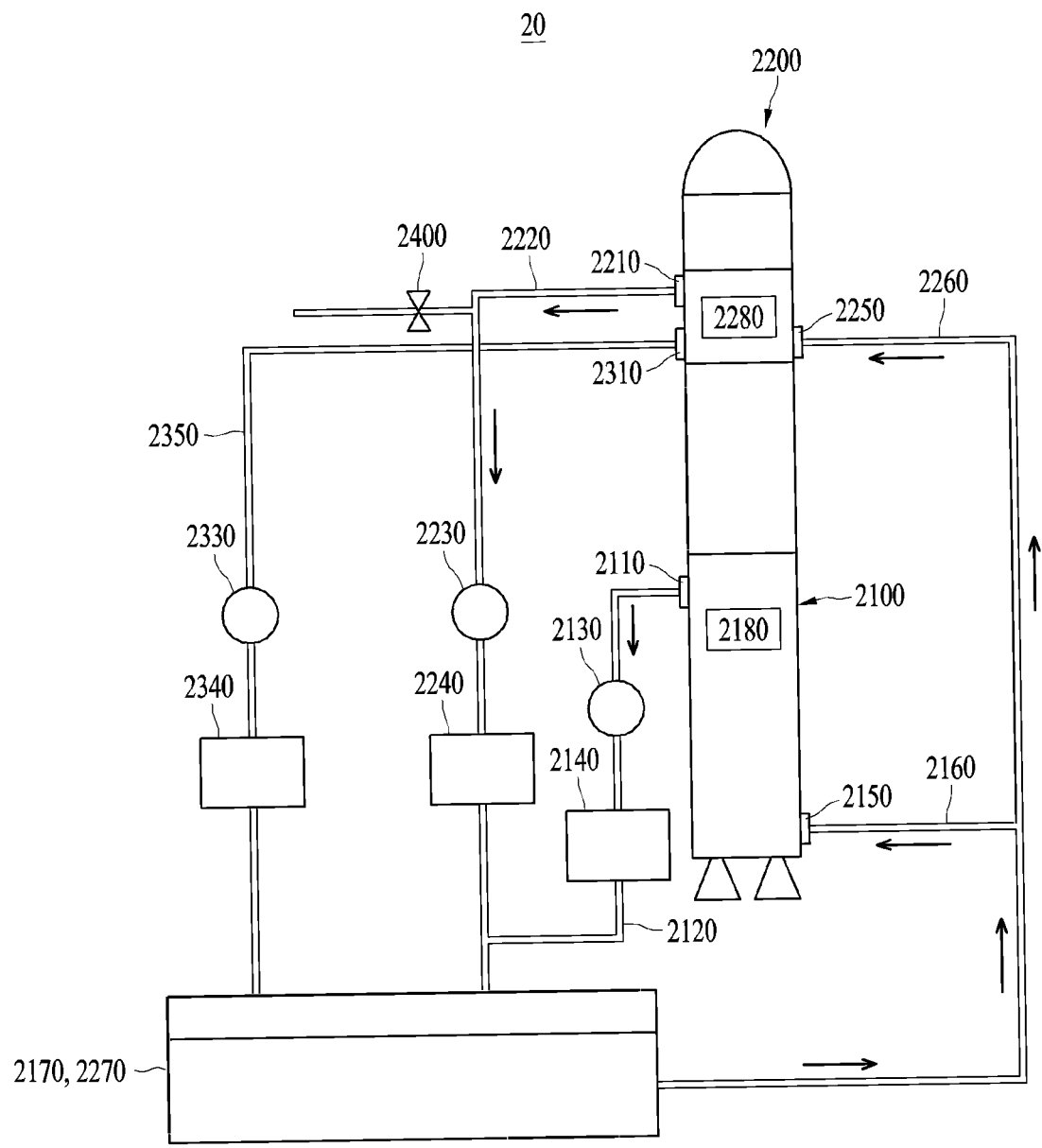
FIG. 2 illustrates a launch pad system according to a second embodiment.

FIG. 2 illustrates a launch pad system 20 according to a second embodiment.

Referring to FIG. 2, in addition to the launch pad system 10 according to the first embodiment, the launch pad system 20 according to the second embodiment may further include an engine cooling port 2310, an engine cooling line 2350, an engine cooling transfer unit 2330, and an engine cooling freezing unit 2340 provided in a launch vehicle 2100, 2200. A launch vehicle engine may be cooled by discharging fuel inside the launch vehicle 2100, 2200. At this time, when the fuel is discharged through the engine cooling port 2310, the launch vehicle engine may be cooled. In order to operate the engine, the engine needs to be cooled to a predetermined temperature or lower. For the launch vehicle that cools the engine by discharging the fuel inside the engine, the launch vehicle engine may be sufficiently cooled as the fuel is discharged through the engine cooling port 2310. The fuel discharged from the engine cooling port 2310 may be cooled while passing through the engine cooling freezing unit 2340 along the engine cooling line 2350 and stored in a launch pad fuel tank 2170, 2270.

Referring to FIG. 2, the engine cooling port 2310 may be provided on the launch vehicle 2100, 2200, and the engine cooling line 2350 may connect the engine cooling port 2310 and the launch pad fuel tank 2170, 2270 such that the fuel may be transferred therethrough. The engine cooling transfer unit 2330 may be provided on the engine cooling line 2350 to transfer the fuel. The engine cooling freezing unit 2340 may be provided on the engine cooling line 2350 to cool the fuel.

The engine cooling line 2350 may control the output of the engine cooling transfer unit 2330 and the output of the engine cooling freezing unit 2340 through interoperation with a temperature sensor and a pressure sensor in the engine. Through this, the launch pad system 20 according to the second embodiment may efficiently cool the launch vehicle engine.

Similar to the launch pad system 10 according to the first embodiment, the launch pad system 20 according to the second embodiment may control the transfer output of a fuel transfer unit 2130, 2230 through interoperation with the pressure sensor and the temperature sensor in a launch vehicle fuel tank 2180, 2280.

Vaporized gas of the fuel may pass through a first fuel transfer unit 2130 or a second fuel transfer unit 2230 and be re-liquefied through a first freezing unit 2140 or a second freezing unit 2240. Vaporized gas of the liquefied fuel may be introduced into the launch pad fuel tank 2170, 2270 and may be used again to charge the launch vehicle fuel tank 2180, 2280.

Figure 3:
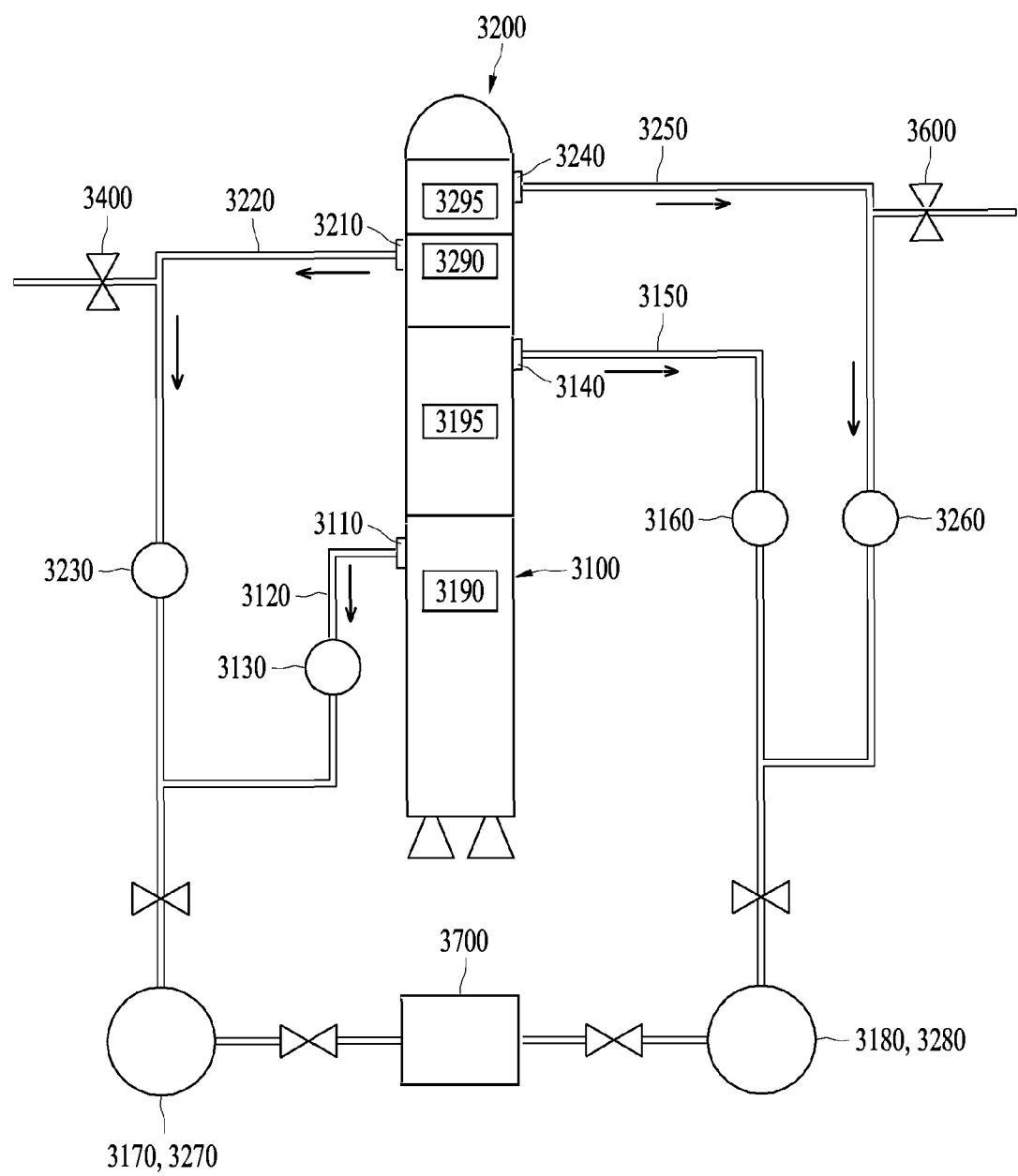
FIG. 3 illustrates a launch pad system according to a third embodiment

FIG. 3 illustrates a launch pad system 30 according to a third embodiment.

Referring to FIG. 3, similar to the launch pad system 10 according to the first embodiment, the launch pad system 30 according to the third embodiment may include a fuel vent port 3110, 3210 provided in a launch vehicle 3100, 3200, a launch pad fuel tank 3170, 3270 provided outside the launch vehicle 3100, 3200 to store fuel, a fuel recovery line 3120, 3220 connecting the fuel vent port 3110, 3210 and the launch pad fuel tank 3170, 3270 such that the fuel may be transferred therethrough, and a fuel transfer unit 3130, 3230 provided on the fuel recovery line 3120, 3220 to transfer the fuel, and the fuel may be recovered from the launch vehicle 3100, 3200 to the launch pad fuel tank 3170, 3270.

The launch vehicle 3100, 3200 may include a first-stage launch vehicle 3100 and a second-stage launch vehicle 3200.

The fuel recovery line 3120, 3220 may include a first fuel recovery line 3120 connected to the first-stage launch vehicle 3100 and a second fuel recovery line 3220 connected to the second-stage launch vehicle 3200.

The fuel vent port 3110, 3210 may include a first fuel vent port 3110 connected to the first fuel recovery line 3120 and a second fuel vent port 3210 connected to the second fuel recovery line 3220.

The fuel transfer unit 3130, 3230 may include a first fuel transfer unit 3130 on the first fuel recovery line 3120 and a second fuel transfer unit 3230 on the second fuel recovery line 3220, and the fuel transfer unit 3130, 3230 may be a pump or a blower.

The fuel or vaporized gas of the fuel may be transferred to the launch pad fuel tank 3170, 3270 through the first fuel transfer unit 3130 or the second transfer unit 3230. The transfer output of the fuel transfer unit 3130, 3230 may be controlled through interoperation with a pressure sensor and a temperature sensor in a launch vehicle fuel tank 3190, 3290. During fuel charging, the output of the fuel transfer unit 3130, 3230 may be controlled so that the launch vehicle fuel tank 3190, 3290 may be internally at the level of atmospheric pressure. In addition, if there is a desired operational fuel temperature of the launch vehicle 3100, 3200, the output of the fuel transfer unit 3130, 3230 may be controlled through interoperation with the temperature sensor in the launch vehicle fuel tank 3190, 3290, and thus, the fuel temperature may be controlled. In addition, the launch pad system 30 according to the third embodiment may further include an oxidizer vent port 3140, 3240 provided in the launch vehicle 3100, 3200, a launch pad oxidizer tank 3180, 3280 provided outside the launch vehicle 3100, 3200 to store an oxidizer, an oxidizer recovery line 3150, 3250 connecting the oxidizer vent port 3140, 3240 and the launch pad oxidizer tank 3180, 3280 such that the oxidizer may be transferred therethrough, and an oxidizer transfer unit 3160, 3260 provided on the oxidizer recovery line 3150, 3250 to transfer the oxidizer, and the oxidizer may be recovered from the launch vehicle 3100, 3200 to the launch pad oxidizer tank 3180, 3280.

The fuel may be hydrogen or methane and may be easy to recycle and free from engine soot. Methane is easier to manage than hydrogen.

The oxidizer recovery line 3150, 3250 may include a first oxidizer recovery line 3150 connected to the first-stage launch vehicle 3100 and a second oxidizer recovery line 3250 connected to the second-stage launch vehicle 3200.

The oxidizer vent port 3140, 3240 may include a first oxidizer vent port 3140 connected to the first oxidizer recovery line 3150 and a second oxidizer vent port 3240 connected to the second oxidizer recovery line 3250.

The oxidizer transfer unit 3160, 3260 may include a first oxidizer transfer unit 3160 on the first oxidizer recovery line 3150 and a second oxidizer transfer unit 3260 on the second oxidizer recovery line 3250, and the oxidizer transfer unit 3160, 3260 may be a pump or a blower.

Similar to the output of the fuel transfer unit 3130, 3230, the output of the oxidizer transfer unit 3160, 3260 may be controlled through interoperation with pressure and temperature sensors in a launch vehicle oxidizer tank 3195, 3295.

The fuel or vaporized gas of the fuel may be transferred from the fuel vent port 3110, 3210 of the launch vehicle 3100, 3200 to the launch pad fuel tank 3170, 3270 through the fuel transfer unit 3130, 3230, and the oxidizer or vaporized gas of the oxidizer may be transferred from the oxidizer vent port 3140, 3240 of the launch vehicle 3100, 3200 to the launch pad oxidizer tank 3180, 3280 through the oxidizer transfer unit 3160, 3260.

The launch pad system 30 according to the third embodiment may further include a fuel cell 3700 connected to the launch pad fuel tank 3170, 3270 and the launch pad oxidizer tank 3180, 3280. The fuel may be hydrogen, and the oxidizer may be oxygen. The fuel cell 3700 may be a hydrogen fuel cell. The fuel cell 3700 may receive hydrogen from the launch pad fuel tank 3170, 3270 and receive oxygen from the launch pad oxidizer tank 3180, 3280 to generate electricity. The launch vehicle 3100, 3200 may be supplied with this electricity.

The launch pad system 30 according to the third embodiment may further include a fuel vent valve 3400 provided on the fuel recovery line 3120, 3220, and a portion of the fuel may be discharged to the outside through the fuel vent valve 3400.

The launch pad system 30 according to the third embodiment may further include an oxidizer vent valve 3600 provided on the oxidizer recovery line 3150, 3250, and a portion of the oxidizer may be discharged to the outside through the oxidizer vent valve 3600.

For the launch pad system 30 according to the third embodiment, in the initial stage of fuel or oxidizer charging or even when the fuel transfer unit 3130, 3230 or the oxidizer transfer unit 3160, 3260 is out of order, the oxidizer, the fuel, the vaporized gas of the oxidizer, the vaporized gas of the fuel, nitrogen, air, and the like may be discharged from the launch vehicle fuel tank 3190, 3290 through the fuel vent valve 3400 and from the launch vehicle oxidizer tank 3195, 3295 through the oxidizer vent valve 3600.

According to embodiments, the launch pad system 10, 20, 30 may liquefy gas exhausted while a launch vehicle is charged with a cryogenic propellant and use the liquefied gas as a propellant or generate electricity.

According to embodiments, the launch pad system 10, 20, 30 may recover and recycle a cryogenic propellant, such as methane, oxygen, or hydrogen, that is abandoned to the outside of a launch vehicle.

According to embodiments, the launch pad system 10, 20, 30 may efficiently cool a launch vehicle engine using a cryogenic propellant abandoned to the outside.

According to embodiments, the launch pad system 10, 20, 30 may recover and use an exhausted propellant for charging, thereby increasing the use efficiency of the propellant.

According to embodiments, the launch pad system 10, 20, 30 may be eco-friendly as recovering an exhausted propellant to prevent the greenhouse effect.

According to embodiments, the launch pad system 10, 20, 30 may prevent a considerable amount of propellant from being vaporized and abandoned from a launch vehicle.

Recently, methane-fueled launch vehicles have been developed, and launch vehicles using the launch pad system 10, 20, 30 according to embodiments may more meet the standards for methane regulation.

A number of embodiments have been described above. Nevertheless, it should be understood that various modifications may be made to these embodiments. For example, suitable results may be achieved if the described techniques are performed in a different order and/or if components in a described system, architecture, device, or circuit are combined in a different manner and/or replaced or supplemented by other components or their equivalents.

Accordingly, other implementations are within the scope of the following claims.

What is claimed is:

1. A launch pad system, comprising:
   a fuel vent port provided in a launch vehicle;
   a launch pad fuel tank provided outside the launch vehicle to store fuel;
   a fuel recovery line connecting the fuel vent port and the launch pad fuel tank such that the fuel is transferred therethrough;
   a fuel transfer unit provided on the fuel recovery line to transfer the fuel;
   a fuel vent valve provided on the fuel recovery line;

an oxidizer vent port provided in the launch vehicle;
a launch pad oxidizer tank provided outside the launch vehicle to store an oxidizer;
an oxidizer recovery line connecting the oxidizer vent port and the launch pad oxidizer tank such that the oxidizer is transferred therethrough; and
an oxidizer vent valve provided on the oxidizer recovery line, wherein the fuel is recovered from the launch vehicle to the launch pad fuel tank;
wherein the oxidizer vent port is a separate and distinct element from the fuel vent port,
wherein a portion of the fuel is discharged to the outside through the fuel vent valve,
wherein the fuel vent valve is provided on a branched line between the fuel vent port and the fuel transfer unit on the fuel recovery line, and
wherein a portion of the oxidizer is discharged to the outside through the oxidizer vent valve.

2. The launch pad system of claim 1, further comprising:
a freezing unit provided on the fuel recovery line to cool the fuel,
wherein the fuel is liquefied through the freezing unit and introduced into the launch pad fuel tank.

3. The launch pad system of claim 1, further comprising:
a fuel inlet port provided in the launch vehicle and connected to the launch pad fuel tank; and
a fuel supply line connecting the launch pad fuel tank and the fuel inlet port to supply the fuel to the launch vehicle,
wherein the fuel stored in the launch pad fuel tank is supplied to the launch vehicle through the fuel supply line and the fuel inlet port.

4. The launch pad system of claim 1, wherein
the launch vehicle comprises a first-stage launch vehicle and a second-stage launch vehicle, and
the fuel recovery line comprises:
a first fuel recovery line connected to the first-stage launch vehicle; and
a second fuel recovery line connected to the second-stage launch vehicle.

5. The launch pad system of claim 1, further comprising:
an oxidizer transfer unit provided on the oxidizer recovery line to transfer the oxidizer,
wherein the oxidizer is recovered from the launch vehicle to the launch pad oxidizer tank via the oxidizer recovery line.

6. The launch pad system of claim 1, further comprising:
a fuel cell connected to the launch pad fuel tank and the launch pad oxidizer tank,
wherein the fuel is hydrogen,
the oxidizer is oxygen, and
the fuel cell receives the hydrogen from the launch pad fuel tank and receives oxygen from the launch pad oxidizer tank to generate electricity.

7. The launch pad system of claim 1, further comprising:
an engine cooling port provided in the launch vehicle;
an engine cooling line connecting the engine cooling port and the launch pad fuel tank such that the fuel is transferred therethrough;
an engine cooling transfer unit provided on the engine cooling line to transfer the fuel; and
an engine cooling freezing unit provided on the engine cooling line to cool the fuel,
wherein the engine cooling line controls an output of the engine cooling transfer unit and an output of the engine cooling freezing unit through interoperation with a temperature sensor and a pressure sensor in an engine.

* * * * *